(12) United States Patent
Sasaki

(10) Patent No.: US 11,270,359 B2
(45) Date of Patent: Mar. 8, 2022

(54) PROGRAM, INFORMATION PROCESSING APPARATUS, AND INFORMATION PROCESSING METHOD

(71) Applicant: SONY CORPORATION, Tokyo (JP)

(72) Inventor: Takahiro Sasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 147 days.

(21) Appl. No.: 16/621,439

(22) PCT Filed: Jun. 1, 2018

(86) PCT No.: PCT/JP2018/021171
§ 371 (c)(1),
(2) Date: Dec. 11, 2019

(87) PCT Pub. No.: WO2019/012851
PCT Pub. Date: Jan. 17, 2019

(65) Prior Publication Data
US 2020/0193490 A1 Jun. 18, 2020

Related U.S. Application Data

(60) Provisional application No. 62/530,713, filed on Jul. 10, 2017.

(51) Int. Cl.
*G06Q 30/02* (2012.01)
*G06Q 30/06* (2012.01)

(52) U.S. Cl.
CPC ..... *G06Q 30/0283* (2013.01); *G06Q 30/0625* (2013.01); *G06Q 30/0643* (2013.01)

(58) Field of Classification Search
CPC ........... G06Q 30/0283; G06Q 30/0625; G06Q 30/0643
See application file for complete search history.

(56) References Cited

U.S. PATENT DOCUMENTS

| 6,965,867 B1* | 11/2005 | Jameson | ................ G06Q 10/06 705/7.12 |
|---|---|---|---|
| 2002/0161693 A1* | 10/2002 | Greenwald | ........ G06Q 30/0601 705/37 |

(Continued)

FOREIGN PATENT DOCUMENTS

| JP | 2001-325482 A | 11/2001 |
|---|---|---|
| JP | 2003-122925 A | 4/2003 |

(Continued)

OTHER PUBLICATIONS

Tokyo Stock Exchange, Inc., Materials for participants in briefing session of next futures option trading system, Task system department of Tokyo Stock Exchange, Inc., Sep. 1997, pp. 1-18.

*Primary Examiner* — Philip J Chea
*Assistant Examiner* — Hassan A Khan
(74) *Attorney, Agent, or Firm* — Paratus Law Group, PLLC

(57) ABSTRACT

There is provided a program, an information processing apparatus, and an information processing method which are able to represent a demand-supply balance that reflects a characteristic of a transaction object, more accurately. The program causes a computer to function as a control unit that, on the basis of inputted transaction orders, controls a display regarding a distribution of the transaction orders in a transaction market, where the transaction orders include a provision order inputted by a provider who desires to provide a transaction object and a reception order inputted by a receiver who desires to receive the transaction object, and the control unit dynamically controls the display regarding the distribution on the basis of two or more elements including a desired transaction price related to each of the provision order and the reception order and including at least one or more characteristics of the transaction object.

17 Claims, 16 Drawing Sheets

(56) References Cited

U.S. PATENT DOCUMENTS

| | | | | |
|---|---|---|---|---|
| 2003/0078872 A1* | 4/2003 | Terashima | ............. | G06Q 40/04 |
| | | | | 705/37 |
| 2007/0260559 A1* | 11/2007 | Ginsberg | ............. | G06Q 50/188 |
| | | | | 705/80 |
| 2012/0278220 A1* | 11/2012 | Chassin | ................ | G06Q 40/04 |
| | | | | 705/37 |
| 2012/0278221 A1* | 11/2012 | Fuller | .................... | G06Q 40/00 |
| | | | | 705/37 |

FOREIGN PATENT DOCUMENTS

| JP | 2003-281409 A | 10/2003 |
|---|---|---|
| JP | 2005-157531 A | 6/2005 |
| JP | 2009-527863 A | 7/2009 |
| JP | 2013-003861 A | 1/2013 |
| JP | 2016-015027 A | 1/2016 |

* cited by examiner

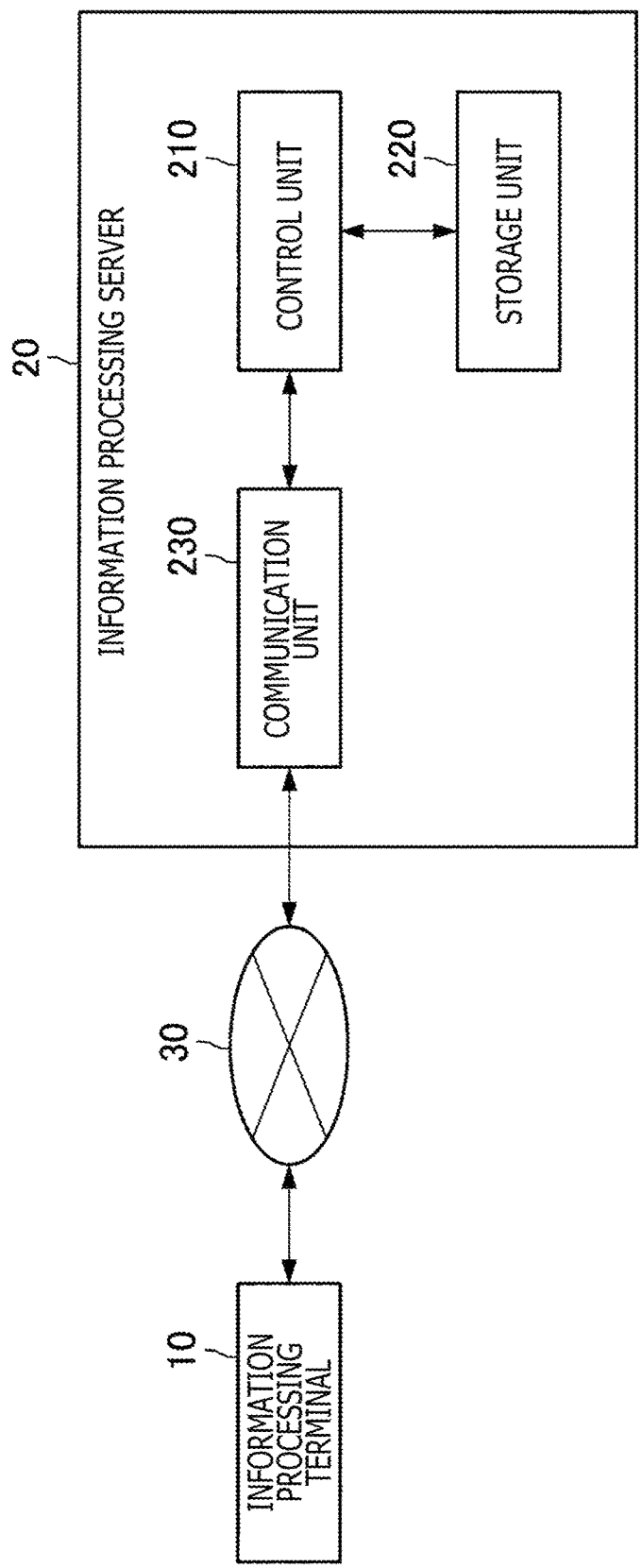
F I G . 2

SALES ORDER

DESIRED SELLING PRICE [¥34,000] OR ABOVE

QUALITY 8/10

USED FOR [3] YEARS

FUNCTION/OPERATION
- ⦿ FULLY OPERATIONAL
- ○ HAS SOME OPERATIONAL FAILURES, BUT WORKS FOR NORMAL USE WITHOUT ANY PROBLEMS
- ○ HAS SOME OPERATIONAL FAILURES, AND USAGE IS LIMITED
- ○ JUNK

COSMETIC CONDITION ○ VERY GOOD ○ GOOD ⦿ FAIR ○ MINOR FLAWS/LIGHT STAINS ○ POOR

STORAGE CONDITION ⦿ APPROPRIATELY MANAGED ENVIRONMENT ○ NORMAL ENVIRONMENT ○ POOR ENVIRONMENT

[ ORDER ] — b1

PURCHASE ORDER

DESIRED PURCHASING PRICE [¥32,000] OR LOWER

QUALITY 7/10

USED FOR LESS THAN [4] YEARS

FUNCTION/OPERATION
- ⦿ FULLY OPERATIONAL
- ○ HAS SOME OPERATIONAL FAILURES, BUT WORKS FOR NORMAL USE WITHOUT ANY PROBLEMS
- ○ HAS SOME OPERATIONAL FAILURES, AND USAGE IS LIMITED
- ○ JUNK

COSMETIC CONDITION ○ VERY GOOD ○ GOOD ⦿ FAIR ○ MINOR FLAWS/LIGHT STAINS ○ POOR

STORAGE CONDITION ⦿ APPROPRIATELY MANAGED ENVIRONMENT ○ NORMAL ENVIRONMENT ○ POOR ENVIRONMENT

[ ORDER ] — b2

FIG.11

PURCHASE ORDER

DESIRED PURCHASING PRICE [¥ 33,000] OR LOWER

QUALITY 7/10

USED FOR LESS THAN [4] YEARS

FUNCTION/OPERATION
- ⦿ FULLY OPERATIONAL
- ○ HAS SOME OPERATIONAL FAILURES, BUT WORKS FOR NORMAL USE WITHOUT ANY PROBLEMS
- ○ HAS SOME OPERATIONAL FAILURES, AND USAGE IS LIMITED
- ○ JUNK (DETAILS OF COMPROMISE)

(COSMETIC CONDITION ○ VERY GOOD ○ GOOD ⦿ FAIR ⦿ MINOR FLAWS/LIGHT STAINS ○ POOR)

STORAGE CONDITION ⦿ APPROPRIATELY MANAGED ENVIRONMENT ○ NORMAL ENVIRONMENT ○ POOR ENVIRONMENT

YOU CAN OBTAIN THIS ITEM IF YOU COMPRISE ON CONDITIONS. SEE BELOW FOR THE DETAILS. DO YOU AGREE ON THE COMPROMISE TO OBTAIN THIS ITEM?

( YES )    ( NO )

FIG.15

| NUMBER OF SALES ORDERS | PRICE | NUMBER OF PURCHASE ORDERS |
|---|---|---|
| | AT MARKET | |
| 1,329,500 | OVER | |
| 4,500 | 4,269 | |
| 10,400 | 4,268 | |
| 8,900 | 4,267 | |
| 37,500 | 4,266 | |
| 25,900 | 4,265 | |
| 6,900 | 4,264 | |
| 300 | 4,263 | |
| 27,700 | 4,262 | |
| 1,000 | 4,261 | |
| 2,200 | 4,260 | |
| | 4,258 | 1,000 |
| | 4,257 | 400 |
| | 4,256 | 2,400 |
| | 4,255 | 400 |
| | 4,254 | 6,100 |
| | 4,253 | 500 |
| | 4,252 | 3,900 |
| | 4,251 | 500 |
| | 4,250 | 1,700 |
| | 4,249 | 7,200 |
| | UNDER | 665,200 |

B, SB, PB

PROGRAM, INFORMATION PROCESSING APPARATUS, AND INFORMATION PROCESSING METHOD

CROSS REFERENCE TO PRIOR APPLICATION

This application is a National Stage Patent Application of PCT International Patent Application No. PCT/JP2018/021171 (filed on Jun. 1, 2018) under 35 U.S.C. § 371, which claims priority to U.S. Provisional Patent Application No. 62/530,713 (filed on Jul. 10, 2017), which are all hereby incorporated by reference in their entirety.

TECHNICAL FIELD

The present disclosure relates to a program, an information processing apparatus, and an information processing method.

BACKGROUND ART

Various transactions have recently been performed between companies, between individuals, between a company and an individual, and the like. Also, many systems have been developed for supporting such transactions. For example, PTL 1 discloses an information processing apparatus of, regarding a sales and purchase transaction of a financial instrument on an exchange, presenting a chart that is excellent in information visibility.

CITATION LIST

Patent Literature

[PTL 1]
JP 2016-15027 A

SUMMARY

Technical Problem

Here, in a sales and purchase transaction of a financial instrument, the transaction price can generally be decided on the basis of a purchasing price and a selling price. Meanwhile, for example, in a case where the characteristics of an article or service which is a transaction object are not stable, the law of one price does not hold. With a technique such as that disclosed in PTL 1, correctly representing a demand-supply distribution in a transaction is difficult.

To this end, the present disclosure proposes a new and improved program, information processing apparatus, and information processing method, by which a demand-supply balance that reflects a characteristic of a transaction object can be represented more accurately.

Solution to Problem

The present disclosure provides a program for causing a computer to function as a control unit that, on the basis of inputted transaction orders, controls a display regarding a distribution of the transaction orders in a transaction market, in which the transaction orders include a provision order inputted by a provider who desires to provide a transaction object and a reception order inputted by a receiver who desires to receive the transaction object, and the control unit dynamically controls the display regarding the distribution on the basis of two or more elements including a desired transaction price related to each of the provision order and the reception order and including at least one or more characteristics of the transaction object.

Also, the present disclosure provides an information processing apparatus including a control unit that, on the basis of inputted transaction orders, controls a display regarding a distribution of the transaction orders in a transaction market, in which the transaction orders include a provision order inputted by a provider who desires to provide a transaction object and a reception order inputted by a receiver who desires to receive the transaction object, and the control unit dynamically controls the display regarding the distribution on the basis of two or more elements including a desired transaction price related to each of the provision order and the reception order and including at least one or more characteristics of the transaction object.

Moreover, the present disclosure provides an information processing method including controlling, by a processor, on the basis of inputted transaction orders, a display regarding a distribution of the transaction orders in a transaction market, in which the transaction orders include a provision order inputted by a provider who desires to provide a transaction object and a reception order inputted by a receiver who desires to receive the transaction object, and the controlling further includes dynamically controlling the display regarding the distribution on the basis of two or more elements including a desired transaction price related to each of the provision order and the reception order and including at least one or more characteristics of the transaction object.

Advantageous Effects of Invention

With the present disclose as explained above, a demand-supply balance that reflects a characteristic of a transaction object can be represented more accurately.

Note that the aforementioned effects are not limitative. Besides the aforementioned effects or instead of the aforementioned effects, any of effects described in the present description or other effects that can be grasped from the present description, may be exerted.

BRIEF DESCRIPTION OF DRAWINGS

FIG. 2 is a block diagram depicting a configuration example of an information processing system according to the embodiment.

FIG. 3 depicts one example of a screen for inputting a provision order according to the embodiment.

FIG. 4 depicts one example of a screen for inputting a reception order according to the embodiment.

FIG. 11 is an explanatory diagram of compromise recommendation according to the embodiment.

FIG. 15 depicts one example of representation of a board regarding sales and purchase transactions of financial instruments according to the embodiment.

DESCRIPTION OF EMBODIMENT

Figure 1:
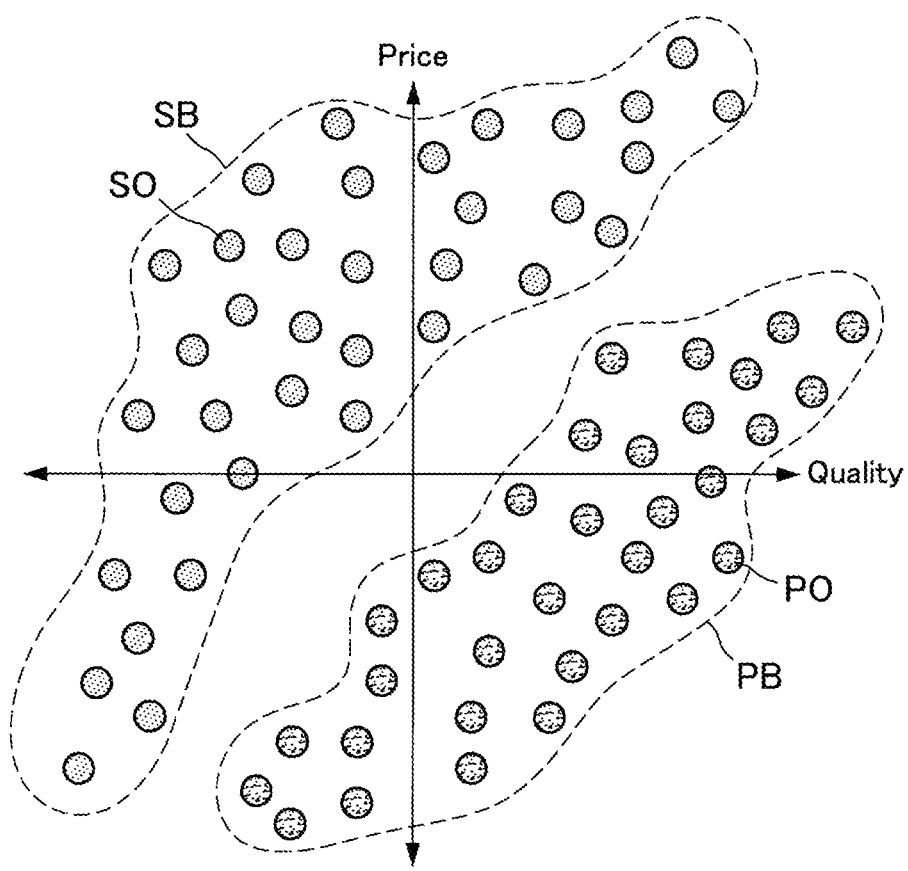
FIG. 1 is an explanatory diagram of an outline of representation of a distribution of transaction orders according to one embodiment of the present disclosure.

Hereinafter, a preferable embodiment of the present disclosure will be explained in detail with reference to the attached drawings. Note that a component having substantially the same functional structure is denoted by the same reference sign throughout the present description and the drawings, and thus, a redundant explanation thereof is omitted.

Note that the explanation will be given in the following order.

1. Embodiment
1.1. Outline
1.2. Configuration Example
1.3. Details of Functions
1.4. Operation Flow
1.5. Variation of Transactions and Characteristics of Transaction Object
2. Hardware Configuration Example
3. Conclusion 1. Embodiment <<1.1. Outline>>

First, the outline of one embodiment of the present disclosure will be described. As described above, various transactions have recently been performed between companies, between individuals, between a company and an individual, and the like. Examples of such transactions include a sales and purchase transaction, the transaction object of which is a financial instrument such as a stock.

Here, in a sales and purchase transaction regarding a financial instrument such as a stock, a "board" is commonly used as means for representing a demand-supply distribution of the sales and purchases.

FIG. 15 depicts one example of representation of a board regarding sales and purchase transactions of financial instruments. In one example depicted in FIG. 15, a sales board SB and a purchase board PB are represented on the left side and the right side of board information BI, respectively, with the price in the center, in the drawing.

Here, the sales board SB and the purchase board PB may represent a distribution of purchase orders and a distribution of sales orders based on desired transaction prices for the respective sales and purchase transactions of financial instruments. For example, one example of the sales board SB depicted in FIG. 15 represents that there are 2,200 sales orders each indicating an intention to sell a financial instrument, which is a transaction object, for ¥4,260. Also, one example of the purchase board PB depicted in FIG. 15 represents that there are 1,000 purchase orders each indicating an intention to purchase a financial instrument, which is a transaction object, for ¥4,258.

In sales and purchase transactions of financial instruments, a "board" can visualize demand-supply distributions based on transaction prices in the above manner. A user can recognize a demand-supply balance in a transaction market by checking such board information BI as that depicted in FIG. 15 through an information processing terminal 10 such as a PC (Personal Computer) or a smartphone, and can strategically decide a transaction price related to the user's sales order or purchase order, for example.

Meanwhile, the law of one price, which holds for a financial instrument as described above, does not hold for some kinds of transaction objects. Examples of such kinds of transaction objects include a used article, a handmade article, and a service. For these kinds of transaction objects, the price of each of the transaction objects varies depending on the characteristics thereof. Thus, different transaction prices are anticipated to be applied for the same transaction object.

Specifically, regarding a transaction of used products, for example, even when products are the same, the characteristics such as the qualities thereof are different among individuals. Thus, the price of each individual can be independently decided according to such conditions as the cosmetic condition or the operation condition. For this reason, a "board" using a price as a one-dimensional scale as depicted in FIG. 15 has difficulty in accurately representing a distribution of potential demands and supplies of a transaction object that has variation in characteristics.

The technical concept according to one embodiment of the present disclosure has been developed in view of the aforementioned problem, and can represent more accurately a demand-supply balance that reflects a characteristic of a transaction object. To this end, a program according to one embodiment of the present disclosure causes a computer to function as a control unit that, on the basis of inputted transaction orders, controls a display regarding a distribution of the transaction orders in a transaction market. The transaction orders may include a provision order inputted by a provider who desires to provide a transaction object and a reception order inputted by a receiver who desires to receive the transaction object. Further, one of the features of the control unit is to dynamically control the display regarding the distribution on the basis of two or more elements including a desired transaction price related to each of the provision order and the reception order and including at least one or more characteristics of the transaction object.

Note that the program, the information processing apparatus, and the information processing method according to one embodiment of the present disclosure are applicable to various types of transactions handling a transaction object having variation in characteristics. Examples of the transaction according to the present embodiment include sales and purchase transactions and rental transactions of articles (including real properties), and various transactions related to provision of service.

For example, in a sales and purchase transaction of an article, the provision order may be a sales order inputted by the provider, that is, a seller candidate, and the reception order may be a purchase order inputted by the receiver, that is, a purchaser candidate.

Also, in a rental transaction of an article, the provision order may be a lending order inputted by a lender candidate, and the reception order may be a borrowing order inputted by a borrower candidate.

Hereinafter, a case where the transaction according to the present embodiment is a sales and purchase transaction of a used product or the like, will be mainly explained.

FIG. 1 is an explanatory diagram of the outline of representation of a distribution of transaction orders according to the present embodiment. One example depicted in FIG. 1 illustrates a case in which, regarding a sales and purchase transaction, the transaction object of which is a used article, an information processing server 20 according to the present embodiment represents a distribution of sales orders and a distribution of purchase orders by using a two-dimensional graph on the basis of two axes, i.e. a desired transaction price and quality of a transaction object.

Here, the information processing server 20 according to the present embodiment can provide a user interface for supporting the sales and purchase transaction, and can acquire information about sales orders or purchase orders inputted via the user interface. In addition, the information processing server 20 according to the present embodiment can generate such a graph as that depicted in FIG. 1 on the basis of the acquired information about sales orders and purchase orders, and can have the graph displayed on the information processing terminal 10 possessed by a user.

Specifically, on the basis of desired transaction prices (desired selling prices) related to acquired sales orders SO and the qualities of the transaction object, the information processing server 20 according to the present embodiment can represent a sales board SB obtained by plotting the sales orders SO on a graph and expanding the graph to two dimensions.

Similarly, on the basis of desired transaction prices (desired purchasing prices) related to acquired purchase orders PO and the desired qualities of the transaction object, the information processing server 20 can represent a purchase board PB obtained by plotting the purchase orders PO on a graph and expanding the graph to two dimensions.

With the aforementioned function of the information processing server 20 according to the present embodiment, a distribution of demands and supplies with a desired transaction price and a characteristic such as the quality of a transaction object designated can be visually presented in multi-dimensions, whereby pricing and setting of sales and purchase conditions by a user can effectively be supported.

Moreover, in this case, the information processing server 20 according to the present embodiment may cause the information processing terminal 10 to display, in different forms, sales orders SO and purchase orders PO as well as a sales board SB and a purchase board PB corresponding to respective distributions of the sales orders SO and purchase orders PO. For example, the information processing server 20 may cause the information processing terminal 10 to display, by using different colors or marks, sales orders SO and purchase orders PO as well as the sales board SB and the purchase board PB.

With the aforementioned function of the information processing server 20 according to the present embodiment, a user can quickly and intuitively recognize a distribution of demands and supplies in a transaction. Accordingly, a seller candidate can easily recognize at what approximate price an article in the seller candidate's possession can be sold, and a purchaser candidate can easily recognize at what approximate price an article desired by the purchaser candidate can be purchased.

<<1.2. Configuration Example>>

Next, a configuration example of the information processing system according to one embodiment of the present disclosure will be explained. FIG. 2 is a block diagram depicting a configuration example of the information processing system according to the present embodiment. Referring to FIG. 1, the information processing system according to the present embodiment includes the information processing terminal 10 and the information processing server 20. In addition, the information processing terminal 10 and the information processing server 20 are connected so as to communicate with each other over a network 30.

(Information Processing Terminal 10)

The information processing terminal 10 according to the present embodiment functions as a display apparatus that displays a user interface for performing various transactions under control of a program or the information processing server 20 according to the present embodiment. Via the aforementioned user interface, a user can input various provision orders and reception orders or can check a distribution of demands and supplies regarding a transaction.

For example, the information processing terminal 10 according to the present embodiment may be a PC, a smartphone, a tablet, or a cell phone possessed by the user.

(Information Processing Server 20)

The information processing server 20 according to the present embodiment is an information processing apparatus that controls a user interface for implementing various transactions between companies, between individuals, between a company and an individual, and the like.

(Network 30)

The network 30 has a function of connecting the information processing terminal 10 to the information processing server 20. The network 30 may include a public line network such as the Internet, a telephone line network, or a satellite communication network, a WAN (Wide Area Network), and various LANs (Local Area Networks) including the Ethernet (registered trademark). Also, the network 30 may include a dedicated line network such as an IP-VPN (Internet Protocol-Virtual Private Network). Moreover, the network 30 may include a wireless communication network such as Wi-Fi (registered trademark) or Bluetooth (registered trademark).

Continuously referring to FIG. 2, a functional configuration example of the information processing server 20 according to the present embodiment will be explained in detail. Referring to FIG. 2, the information processing server 20 according to the present embodiment includes a control unit 210, a storage unit 220, and a communication unit 230.

(Control unit 210)

The control unit 210 according to the present embodiment has a function of controlling, on the basis of inputted transaction orders, a display regarding a distribution of the transaction orders in a transaction market. Here, the transaction orders may include the aforementioned various provision orders and reception orders. Moreover, one of the features of the control unit 210 according to the present embodiment is to dynamically control the display regarding the distribution on the basis of two or more elements including a desired transaction price related to each of the provision orders and the reception orders and including at least one or more characteristics of a transaction object.

Note that, as described above, transactions according to the present embodiment may include various transactions such as a sales and purchase transaction and a rental transaction. Further, examples of the aforementioned characteristics of the transaction object include a due time, in addition to the quality, which is exemplified in FIG. 1. Characteristics of the transaction object according to the present embodiment can flexibly vary depending on the transaction form, the property of the transaction object, or the like. Specific examples of characteristics of the transaction object according to the present embodiment will be explained in detail later.

In addition, the control unit 210 according to the present embodiment may cause the information processing terminal 10 to display the provision orders and the reception orders by using a graph in which the above elements are set as axes. For example, as depicted in FIG. 1, the control unit 210 can cause the information processing terminal 10 to display, as a sales board and a purchase board, a distribution of the sales orders and a distribution of the purchase orders, respectively, by using a two-dimensional graph in which two elements, i.e. a desired transaction price and a quality, are set as axes.

Note that the graph representation achieved by the control unit 210 according to the present embodiment is not limited to such a two-dimensional graph as that depicted in FIG. 1. In the case where the characteristics of the transaction object include a quality and a due time, for example, the control unit 210 may generate a three-dimensional graph in which three elements, i.e. a desired transaction price, a quality, and a due time, are set as axes, and may cause the information processing terminal 10 to display the graph.

Thus, the control unit 210 according to the present embodiment can represent a distribution of transaction orders expanded to multiple dimensions in accordance with the number of the characteristics of the transaction object.

Meanwhile, in the case where the transaction object has two or more characteristics, the control unit 210 according to the present embodiment may generate a graph by performing dimensional compression on a distribution regarding provision orders and reception orders on the basis of three or more elements including a desired transaction price, and may cause the information processing terminal 10 to display the graph.

Here, the control unit 210 according to the present embodiment can use a dimensional compression technique focused on a linear element or a dimension reduction technique in which a non-linear component is taken into consideration. Examples of the dimensional compression technique focused on a linear element include Random Projection, PCA (Principal Component Analysis), and Linear Discriminant Analysis.

Examples of the dimension reduction technique focused on a non-linear component include Isomap, Locally Linear Embedding, Modified Locally Linear Embedding, Hessian Eigenmapping, Spectral Embedding, Local Tangent Space Alignment, Multi-dimensional Scaling, t-SNE, and Random Forest Embedding.

With the aforementioned function of the control unit 210 according to the present embodiment, a distribution of transaction orders regarding an article or service having a plurality of characteristics can be represented in low dimensions (e.g. two dimensions), whereby a user can more intuitively recognize a demand-supply state.

(Storage Unit 220)

The storage unit 220 according to the present embodiment stores various types of information regarding provision orders, reception orders and the like, inputted via the aforementioned user interface.

(Communication Unit 230)

The communication unit 230 according to the present embodiment performs information communication with a plurality of the information processing terminals 10 over the network 30. The communication unit 230 according to the present embodiment transmits, to each of the information processing terminals 10, a control signal regarding the user interface generated by the control unit 210, for example. Further, the communication unit 230 receives, from each of the information processing terminals 10, information regarding provision orders and reception orders inputted via the aforementioned user interface, for example.

The functional configuration example of the information processing server 20 according to the present embodiment has been explained in detail above. Note that the functional configuration example having been explained with use of FIG. 2 above is just one example, and the functional configuration of the information processing server 20 according to the present embodiment is not limited to this example. The functional configuration of the information processing server 20 according to the present embodiment can flexibly be modified according to the specifications and operations.

<<1.3. Details of Functions>>

Next, the functions of the control unit 210 according to the present embodiment will be explained in detail. First, registration of provision orders and reception orders according to the present embodiment will be explained. A user can perform various transactions by inputting a provision order such as a sales order or a reception order such as a purchase order via the user interface being controlled by the control unit 210.

FIG. 3 depicts one example of a screen SC1 for inputting a provision order according to the present embodiment. Note that FIG. 3 depicts a screen example in which a user inputs a sales order thereto. When desiring to sell an article in the user's possession, the user can resister a sales order by inputting various types of information on the screen SC1 depicted in FIG. 3, for example.

Here, the user inputs a desired selling price of the article in the user's possession on the screen SC1, as depicted in FIG. 3, for example. Further, the user inputs, on the screen SC1, information regarding characteristics of the article in the user's possession, that is, a transaction object. Note that FIG. 3 depicts one example in which the user inputs quality as a characteristic of the transaction object.

Here, the user may input the comprehensive level of the quality of the article in the user's possession by using a scale from 1 to 10, for example. Alternatively, the control unit 210 according to the present embodiment may determine the quality on the basis of a usage condition (number of years in use, frequency of use), an operation condition, a cosmetic condition, a storage condition, and the like, of the transaction object inputted by the user. In one example depicted in FIG. 3, the control unit 210 calculates the quality of the articles in the user's possession as being level 8 on a scale from 1 to 10, on the basis of the aforementioned items inputted by the user.

Thus, with the control unit 210 according to the present embodiment, a characteristic such as the quality of a transaction object can be evaluated objectively and highly precisely on the basis of information inputted by a user.

Note that the usage condition, the operation condition, the cosmetic condition, the storage condition, and the like, indicated in FIG. 3 may be used for determination of the quality of the transaction object, and may further be used as a characteristic equivalent to the quality. In this case, the control unit 210 can generate a two-dimensional graph or a three-dimensional graph based on three elements, i.e. a desired transaction price, a quality, and the number of years in use, for example.

In addition, the control unit 210 may perform control to change an axis to be used in a graph display on the basis of a user's operation or the like, for example. In the two-dimensional graph depicted in FIG. 1, for example, the control unit 210 can change, on the basis of user's selection of the number of years in use as a display item, an element to be applied for the abscissa of the graph from the quality to the number of years in use, and plot the orders again.

The screen SC1 for inputting a provision order according to the present embodiment has been explained above by giving an example. The user can register a provision order such as a sales order by inputting the aforementioned various types of information and pressing an order button b1 on the screen SC1. Here, the control unit 210 according to the present embodiment performs control to add the provision order to a corresponding coordinate position on the graph on the basis of the desired transaction price, the characteristic or the like inputted by a provider on the screen SC1.

Next, a screen SC2 for inputting a reception order according to the present embodiment will be explained. FIG. 4 depicts one example of the screen SC2 for inputting a reception order according to the present embodiment. Note that FIG. 4 depicts a screen example in which a user inputs a purchase order. When desiring to purchase an article, the user can register a purchase order by inputting various types of information on such screen SC2 as that depicted in FIG. 4, for example.

Here, the user inputs a desired purchasing price of the article on the screen SC2, similarly to the case of a purchase order. Further, the user inputs information regarding a desired quality and the like of the article on the screen SC2. When doing so, the user may designate the quality level of the article which the user desires to purchase, by using a scale from 1 to 10, for example. Also, as explained above, the control unit 210 may determine the quality on the basis of a usage condition, an operation condition, a cosmetic condition, a storage condition, and the like, of the transaction object inputted by the user.

The screen SC2 for inputting a reception order according to the present embodiment has been explained above by giving an example. The user can register a reception order such as a purchase order by inputting the aforementioned various types of information and pressing an order button b2 on the screen SC2. Here, the control unit 210 according to the present embodiment performs control to add the reception order to a corresponding coordinate position on the graph on the basis of a desired transaction price or a characteristic inputted by the receiver on the screen SC2.

Note that, although the case where the user registers a provision order, a reception order or the like by inputting information regarding a desired transaction price and a characteristic has been explained above, the control unit 210 according to the present embodiment can automatically generate a provision order or a reception order on the basis of a user's operation on a graph, for example.

Figure 5:
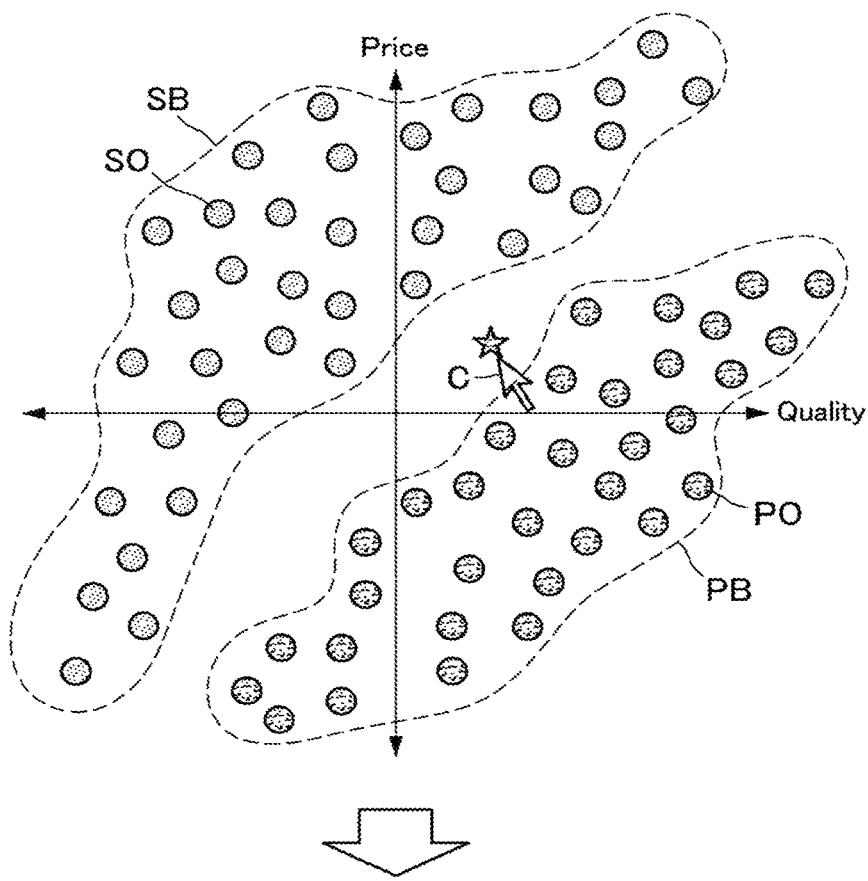
FIG. 5 is an explanatory diagram of generation of a transaction order based on coordinate designation on a graph according to the embodiment.

FIG. 5 is an explanatory diagram of generation of a transaction order based on coordinate designation on a graph according to the present embodiment. FIG. 5 depicts one example in which the control unit 210 according to the present embodiment generates a purchase order on the basis of coordinates selected by a user on a graph.

For example, a user may move a cursor C through a mouse operation or the like, select given coordinates on the graph displayed on the user interface, for example, thereby, making an order corresponding to the coordinates.

Here, on the basis of the coordinate position selected with use of the cursor C, the control unit 210 according to the present embodiment may control transition to the screen SC2 in which a desired transaction price and the value of a quality corresponding to the coordinates have been inputted, as depicted in the lower part of FIG. 5. Note that the control unit 210 can also reversely calculate the values of a usage condition, an operation condition, a cosmetic condition, a storage condition, and the like, from the value of the selected quality.

With the aforementioned function of the control unit 210 according to the present embodiment, a user can easily register a sales order or a purchase order by correcting inputted information, as needed.

Registration of a provision order and a reception order according to the present embodiment has been explained above. On the basis of a provision order and a reception order registered in the above manner, the control unit 210 according to the present embodiment can dynamically control the display of the graph representing a distribution of the provision order and the reception order.

Figure 6:
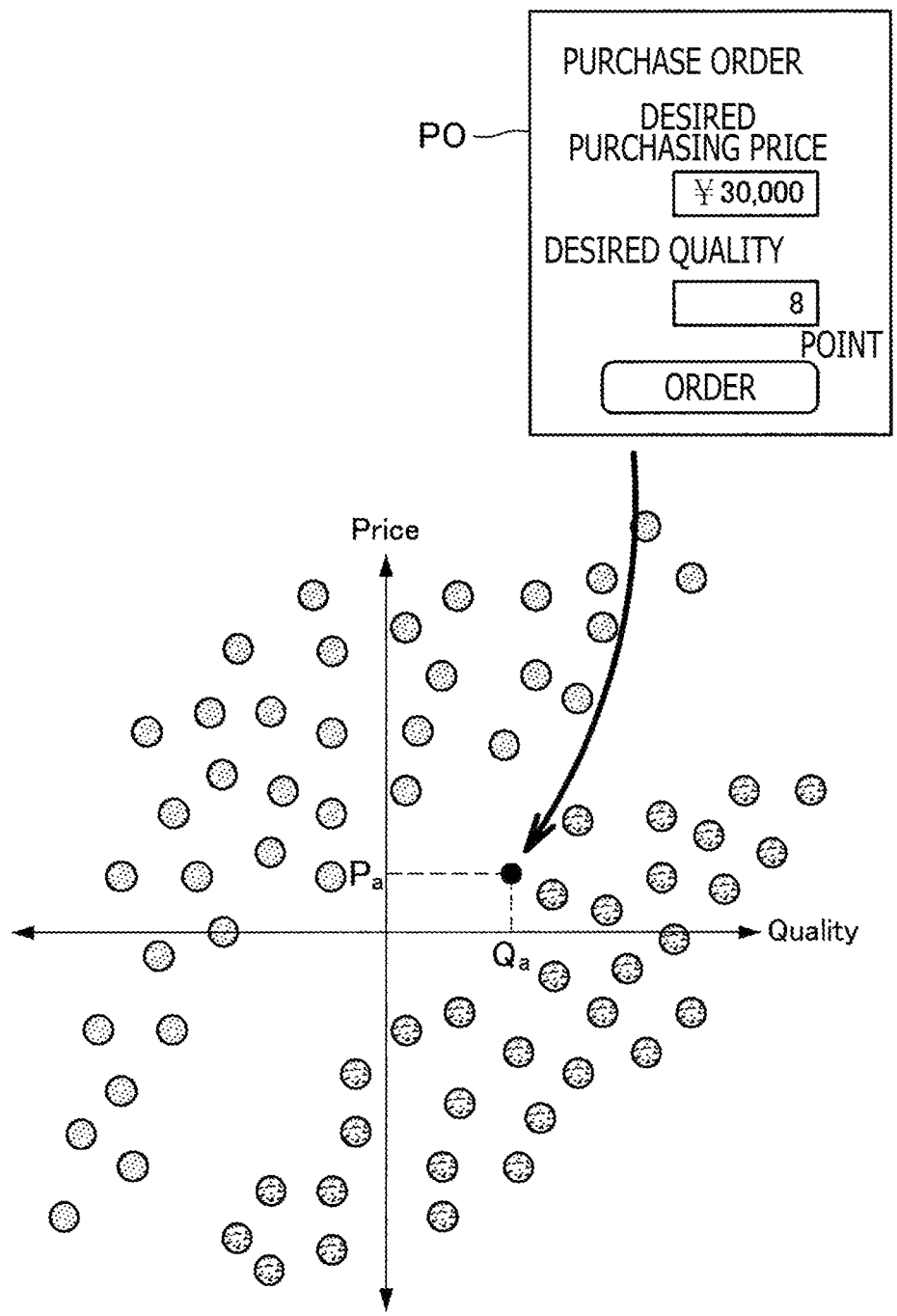
FIG. 6 is an explanatory diagram of a display of an order with one numerical value designated according to the embodiment.

Note that the control unit 210 may receive a transaction order with the characteristic such as the quality and the desired transaction price designated by one numerical value, as described above and plot the transaction order on a graph, as depicted in FIG. 6. In one example depicted in FIG. 6, on the basis of the numerical value ($P_a$) of a desired purchasing price and the numerical value ($Q_a$) of a desired quality which are designated by a user in a purchase order PO, the control unit 210 plots, by using a dot, the purchase order PO at the corresponding coordinates ($P_a$, $Q_a$).

Figure 7:
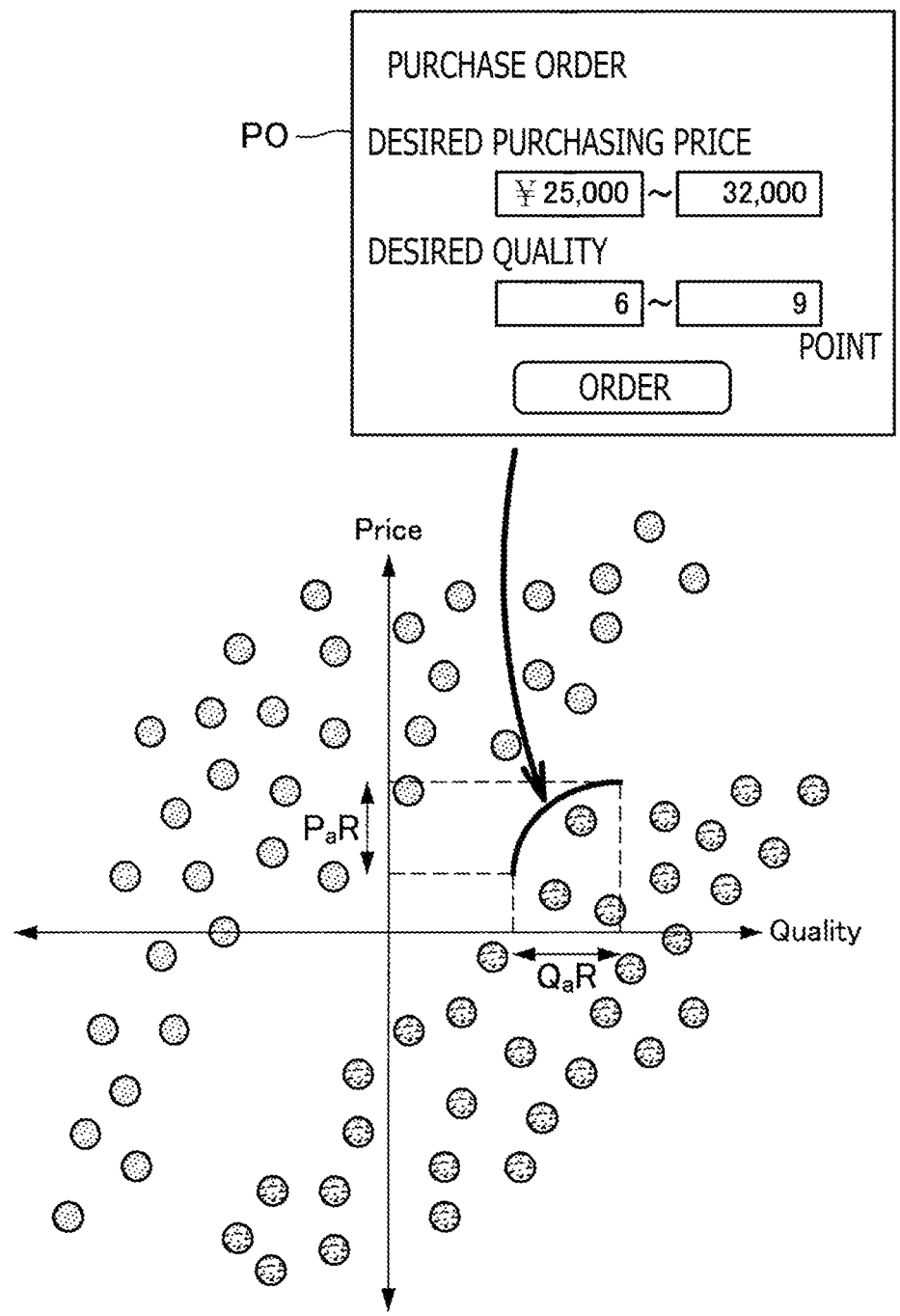
FIG. 7 is an explanatory diagram of a display of an order with a numerical value range designated according to the embodiment.

Meanwhile, the control unit 210 according to the present embodiment can receive a transaction order with a given numerical value range designated, and plot the transaction order on a graph. FIG. 7 is an explanatory diagram of a display of orders with a numerical value range designated according to the present embodiment.

In one example depicted in FIG. 7, the control unit 210 linearly plots a purchase order PO at corresponding coordinates ($P_aR$, $Q_aR$) on the basis of the numerical value range ($P_aR$) of a desired purchasing price and the numerical value range ($Q_aR$) of a desired quality which are designated by the user in the purchase order PO. Thus, with the control unit 210 according to the present embodiment, it is also possible to visualize on a graph a distribution of transaction orders with a numerical value range designated. Note that, even when a numerical value range is designated, each transaction order is regarded as a single order. Thus, the whole linear plot thereof may be deleted from the graph in the case where a transaction order with which matching is established in conditions is generated.

Registration and a display example of transaction orders according to the present embodiment have been explained above. Note that, besides the aforementioned display control, the control unit 210 according to the present embodiment may perform various kinds of control for enhancing the user convenience.

Figure 8:
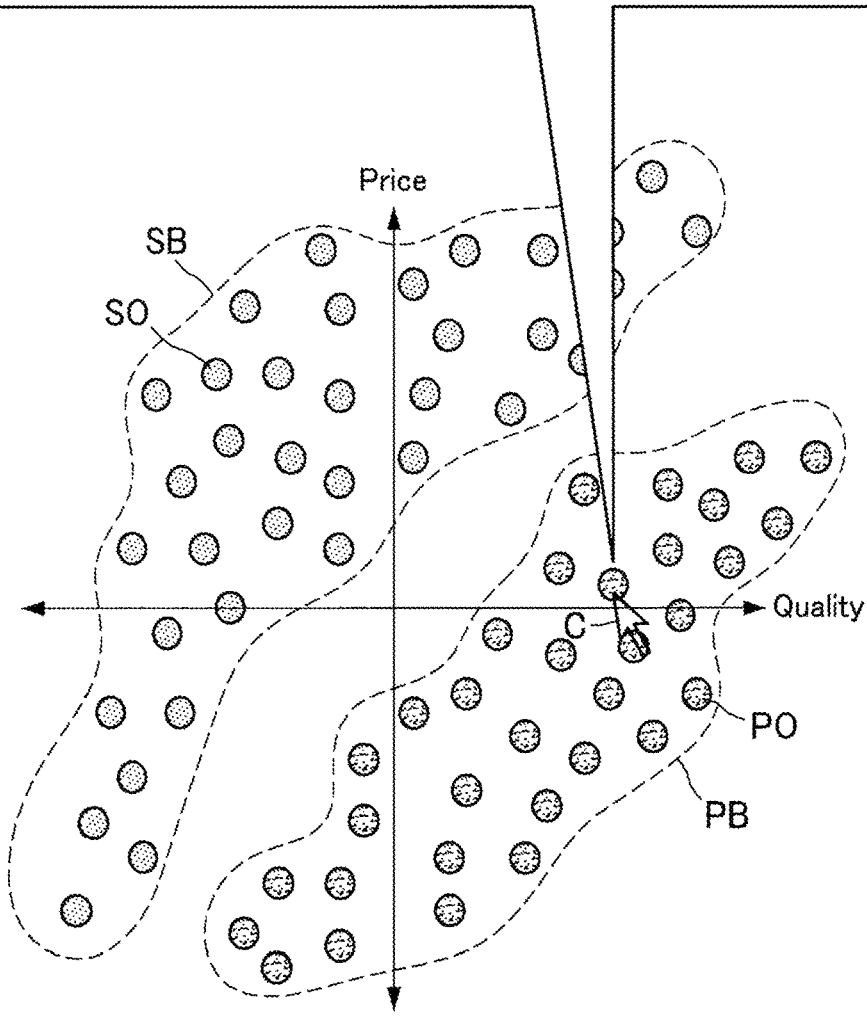
FIG. 8 is a diagram depicting one example of a superposition display of detailed information according to the embodiment.

The control unit 210 according to the present embodiment may improve convenience by superimposing, on the graph, detailed information regarding a transaction order plotted on the graph, for example. FIG. 8 is a diagram depicting one example of a superposition display of detailed information according to the present embodiment.

In one example depicted in FIG. 8, the control unit 210 performs superposition display of detailed information DI corresponding to a purchase order on a graph on the basis of mouse over of the cursor C on a plot representing the purchase order as a result of a mouse operation.

With the aforementioned function of the control unit 210 according to the present embodiment, a user can confirm the details of any transaction order without changing the screen for each transaction order, whereby a speedy transaction can be supported.

Next, determination as to establishment of a transaction according to the present embodiment will be explained. For example, in a case where a transaction object, such as the aforementioned financial instrument, for which the law of one price holds is handled, the number of price forming points related to establishment of the transaction is one. Specifically, in one example depicted in FIG. 15, the price forming point is set at a point of contact between the lower end of the sales board SB and the upper end of the purchase board PB, and a transaction is established there.

Figure 9:
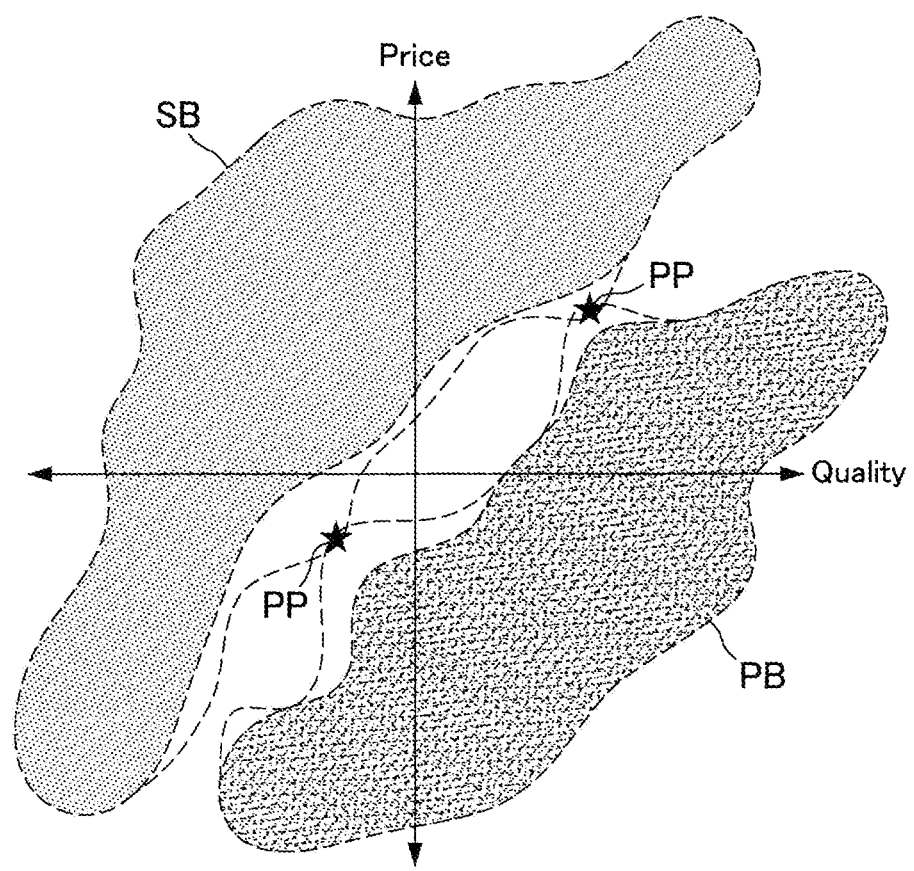
FIG. 9 is a diagram depicting a transaction establishment image according to the embodiment.

In contrast, a plurality of price forming points may be formed in a transaction according to the present embodiment. FIG. 9 is a diagram depicting a transaction establishment image according to the present embodiment. FIG. 9 depicts the sales board SB and the purchase board PB the display of which is dynamically controlled by the control unit 210.

Here, a distribution in the sales board SB and a distribution in the purchase board PB dynamically change depending on registration, change, and cancellation of a transaction order, transaction establishment, and the like. Each of points where a curved line at the lower end of the sales board SB and a curved line at the upper end of the purchase board PB are in contact, can be used as a price forming point PP. In one example depicted in FIG. 9, it can be seen that the price forming points PP are formed at two points, that is, an upper right point and a lower left point in the graph.

As explained so far, in a transaction according to the present embodiment, demand-supply matching may be performed multi-dimensionally on the basis of a plurality of elements.

Specifically, the control unit 210 according to the present embodiment is characterized by making determination as to transaction establishment between a provision order and a reception order on the basis of a desired transaction price and a characteristic of a transaction object.

Figure 10:
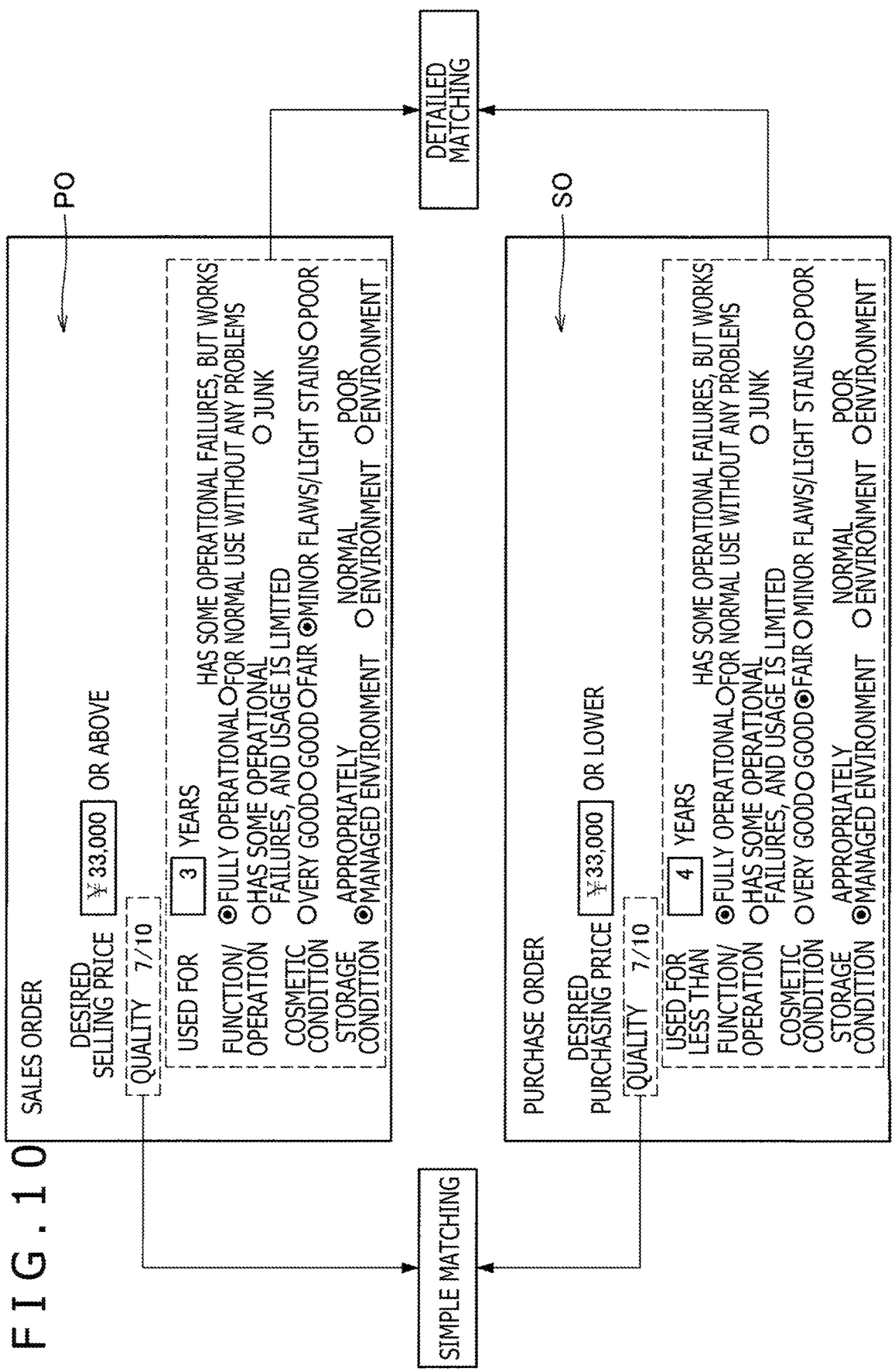
FIG. 10 is an explanatory diagram of determination as to transaction establishment according to the embodiment.

FIG. 10 is an explanatory diagram of determination as to transaction establishment according to the present embodiment. Note that FIG. 10 depicts one example in which the control unit 210 determines transaction establishment between a sales order SO and a purchase order PO on the basis of a desired transaction price and the quality of a transaction object.

Here, the control unit 210 according to the present embodiment first performs simple matching for determining whether or not matching is established in the desired transaction price and the quality as a comprehensive value between a sales order SO and a purchase order PO.

Here, in the case the condition is matched, the control unit 210 subsequently performs detailed matching for determining whether or not matching is established in all the detailed items for determining the quality, between the sales order SO and the purchase order PO.

For example, the control unit 210 makes, for each of the detailed items, determination as to, for example, whether or not the number of years in use of the transaction object of the sales order SO matches the desired number of years in use of the purchase order PO, thereby determining whether or not matching is fully established in the conditions regarding the transaction.

Here, in the case where matching in all the detailed items is established between the sales order SO and the purchase order PO, the control unit 210 is allowed to determine transaction establishment.

With the aforementioned function of the control unit 210 according to the present embodiment, it is possible to make a highly accurate determination in which, in addition to a desired transaction price, a condition related to a characteristic of a transaction object is taken into consideration.

On the other hand, in the case where a desired transaction price or a non-matching detailed item exists in the detailed matching which is performed in the case where matching is established in the condition in the simple matching, the control unit 210 may perform control to issue a notification for recommending information about a transaction condition to at least the provider or the receiver.

FIG. 11 is an explanatory diagram of recommendation of a compromise according to the present embodiment. In one example depicted in FIG. 11, the control unit 210 according to the present embodiment performs control to issue a notification for recommending a compromise to a purchaser candidate on the basis of non-establishment of matching in a cosmetic condition, among detailed items for determining the quality, between a sales order SO and a purchase order PO. Specifically, the control unit 210 outputs, on a screen, a notification that, if the cosmetic condition having minor flaws/light stains is compromised, the transaction can be established.

Thus, with the control unit 210 according to the present embodiment, a user is notified of a transaction order having a close transaction condition and the specific details of a compromise, whereby establishment of a transaction between users is promoted so that a transaction market can efficiently be invigorated.

<<1.4. Operation Flow>>

Figure 12A:
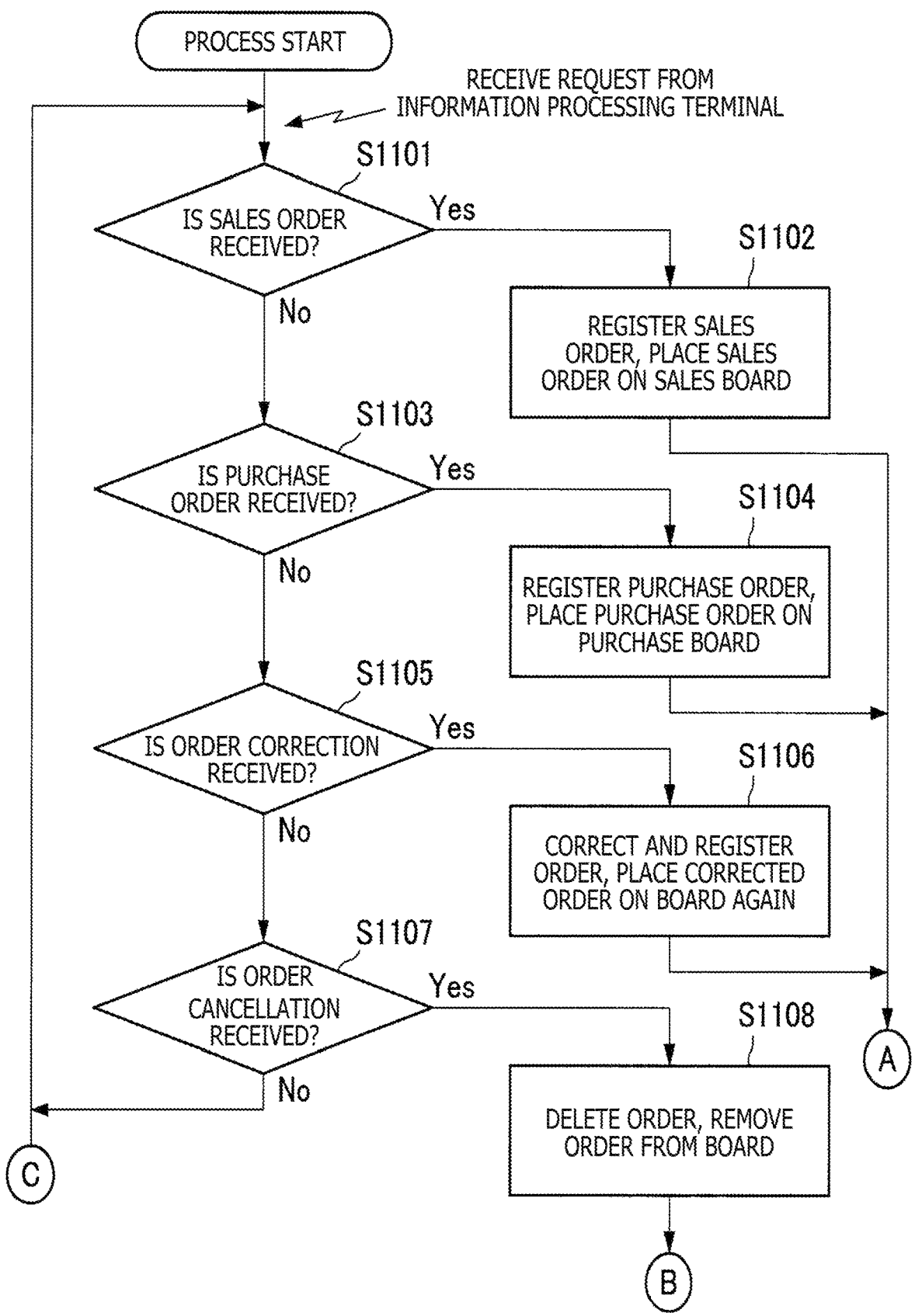
FIG. 12A is a flowchart depicting an operation flow of an information processing server according to the embodiment.
Figure 12B:
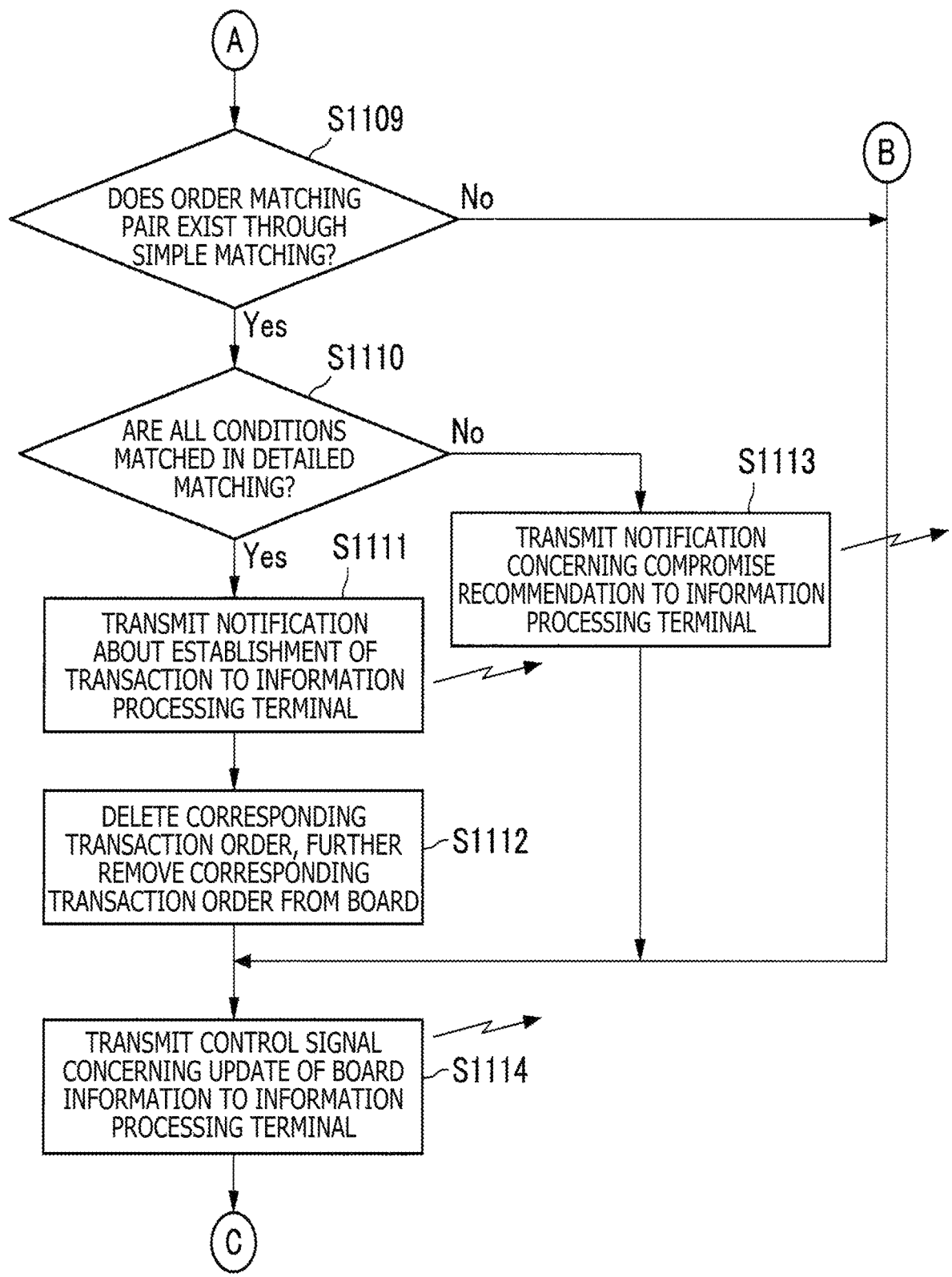
FIG. 12B is a flowchart depicting an operation flow of the information processing server according to the embodiment.

Next, operation flows of the information processing server 20 and the information processing terminal 10 according to the present embodiment will be explained. First, the operation flow of the information processing server 20 according to the present embodiment will be explained. FIGS. 12A and 12B are flowcharts each depicting the operation flow of the information processing server 20 according to the present embodiment. Note that FIGS. 12A and 12B each depict, as one example, a flow in which the information processing server 20 according to the present embodiment controls a user interface for performing a sales and purchase transaction of an article. Further, reference signs "A," "B," and "C" in FIGS. 12A and 12B are given to denote connection between the flowcharts.

When processing is started, the control unit 210 of the information processing server 20 executes various processes on the basis of a request received by the communication unit 230 from the information processing terminal 10.

For example, in the case where the communication unit 230 receives a request regarding a sales order from the information processing terminal 10 (S1101: Yes), the control unit 210 registers and places the sales order on a sales board (S1102).

Moreover, in the case where the communication unit 230 receives a request regarding a purchase order from the information processing terminal 10 (S1103: Yes), the control unit 210 registers and places the purchase order on a purchase board (S1104).

Further, in the case where the communication unit 230 receives a request regarding correction of a transaction order from the information processing terminal 10 (S1105: Yes), the control unit 210 corrects the corresponding transaction order and places the transaction order on the board again (S1106).

Further, in the case where the communication unit 230 receives a request regarding cancellation of a transaction order from the information processing terminal 10 (S1107: Yes), the control unit 210 deletes the corresponding transaction order and removes the corresponding transaction order from the board (S1108).

Here, in the case any one of the processes at steps S1102, S1104, and S1106 is executed, the control unit 210 subsequently determines whether or not a pair of a sales order and a purchase order having been matched through the aforementioned simple matching exists (S1109).

Here, in the case where a pair of a sales order and a purchase order having been matched through the simple matching exists (S1109: Yes), the control unit 210 subsequently determines whether or not matching is established in all the transaction conditions, by performing the aforementioned detailed matching (S1110).

Here, in the case where matching is established in all the transaction conditions through the detailed matching (S1110: Yes), the control unit 210 transmits a notification about establishment of the sales and purchase transaction to each of the information processing terminals 10 possessed by the seller candidate and the purchaser candidate (S1111), and deletes the corresponding transaction orders and further removes the corresponding transaction orders from the boards (S1112).

On the other hand, in the case where matching is not established in all the transaction conditions through the detailed matching (S1110: No), the control unit 210 transmits a notification for recommending a compromise on the transaction conditions to at least either one of the information processing terminals 10 possessed by the seller candidate and the purchaser candidate (S1113).

Also, in the case where no pair of a sales order and a purchase order having been matched through the simple matching exists (S1109: No) or in the case where any one of steps S1108, S1112, and S1113 is executed, the control unit 210 transmits a control signal regarding update of the board information to the information processing terminals 10 (S1114), and recovers to a request-reception waiting state.

Figure 13A:
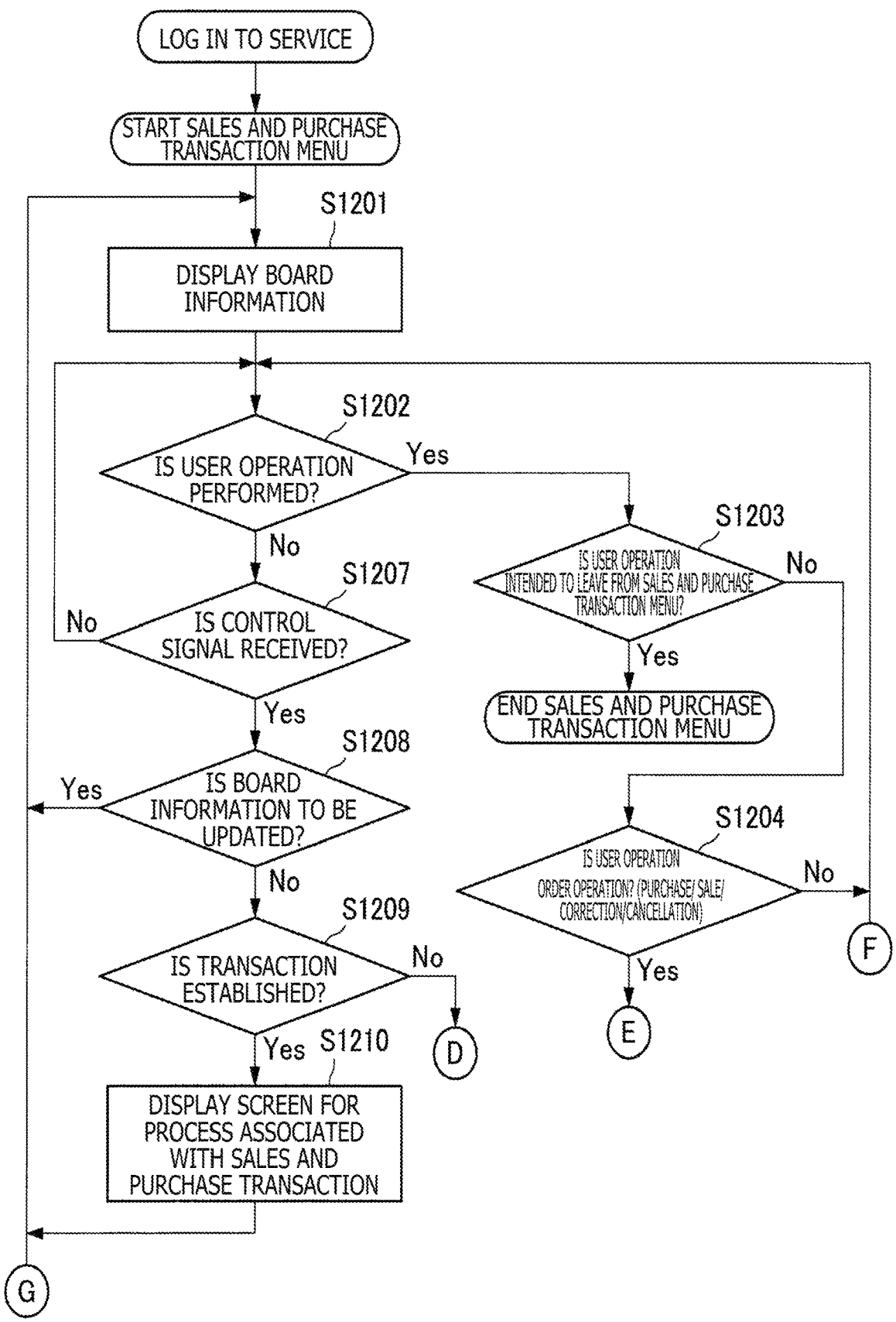
FIG. 13A is a flowchart depicting an operation flow of an information processing terminal according to the embodiment.
Figure 13B:
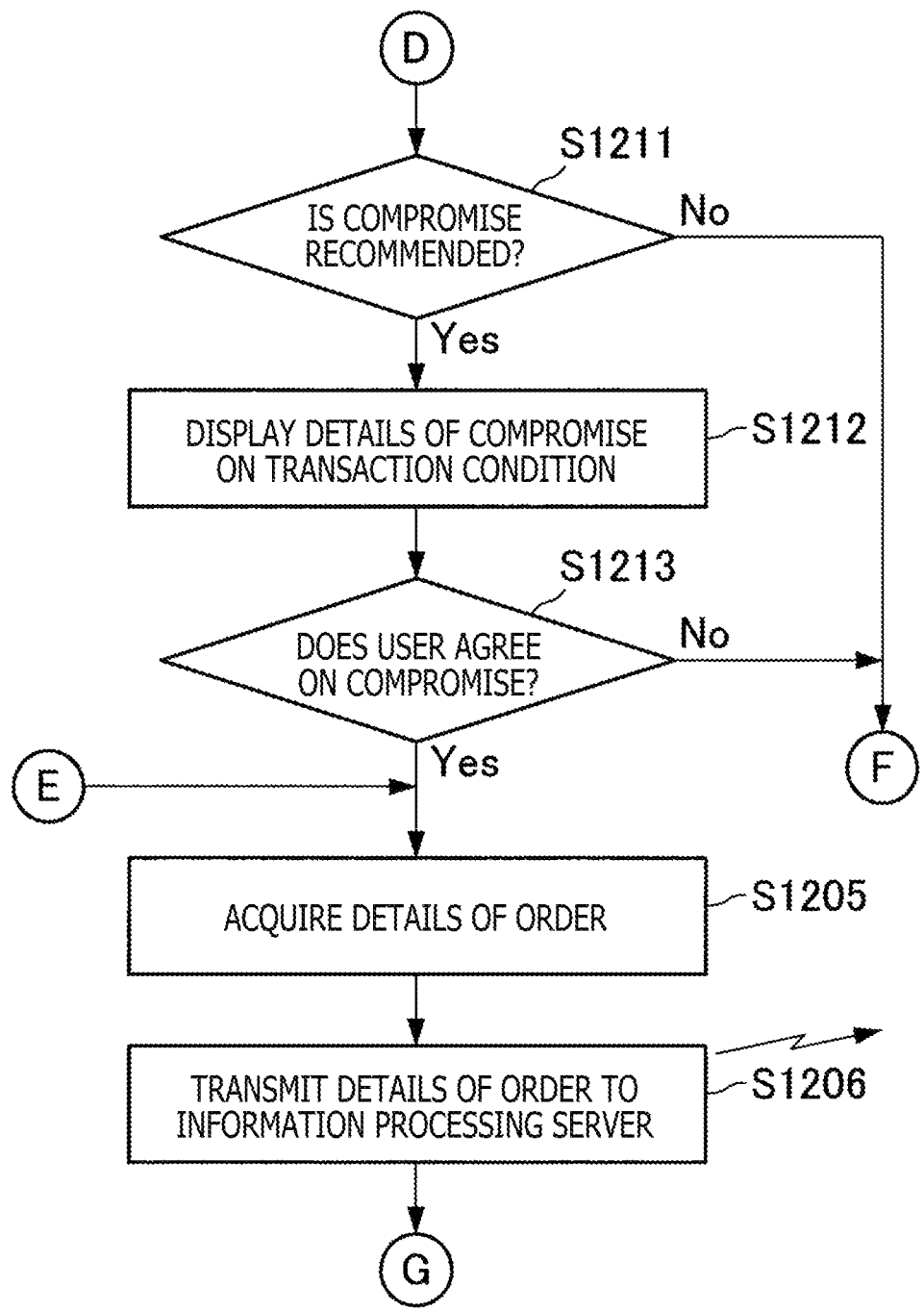
FIG. 13B is a flowchart depicting an operation flow of the information processing terminal according to the embodiment.

Next, the operation flow of the information processing terminal 10 which is controlled by the information processing server 20 according to the present embodiment will be explained. FIGS. 13A and 13B are flowcharts each depicting the operation flow of the information processing terminal 10 according to the present embodiment. Note that FIGS. 13A and 13B each depict, as one example, a flow in which the information processing terminal 10 according to the present embodiment displays a user interface for performing a sales and purchase transaction of an article. Further, reference signs "D," "E," "F," and "G" in FIGS. 13A and 13B are given to denote connection between the flowcharts.

When a sales and purchase transaction menu is started after logging in to a service is carried out via the user interface, the information processing terminal 10 first receives a control signal regarding a display of board information from the information processing server 20, and displays the board information on the basis of the control signal (S1201).

In the case where a user's operation is detected here (S1202: Yes), the information processing terminal 10 transmits information regarding the user's operation to the information processing server 20. Here, in the case where the information processing server 20 determines that the user's operation detected at step S1202 is intended to leave the sales and purchase transaction menu (S1203: Yes), the information processing terminal 10 ends the display regarding the sales and purchase transaction menu.

On the other hand, in the case where the information processing server 20 determines that the user's operation detected at step S1202 is not intended to leave the sales and purchase transaction menu (S1203: No), the information processing server 20 subsequently determines whether or not the user's operation is an order operation for purchase, sale, correction, cancellation, or the like.

Here, in the case where the information processing server 20 determines that the user's operation detected at step S1202 is not an order operation (S1204: No), the information processing terminal 10 returns to step S1202.

On the other hand, in the case where the information processing server 20 determines that the user's operation detected at step S1202 is an order operation (S1204: Yes), the information processing terminal 10 acquires order details corresponding to each order operation (S1205), and transmits the order details to the information processing server 20 (S1206).

Note that, in the case where no user's operation is detected at step S1202 (S1202: No), the information processing terminal 10 determines whether or not a control signal is received from the information processing server 20.

In the case where no control signal is received from the information processing server 20 here (S1207: No), the information processing terminal 10 returns to step S1202.

On the other hand, in the case where a control signal is received from the information processing server 20 (S1207: Yes), the information processing terminal 10 determines whether or not the received control signal is regarding update of the board information.

Here, in the case where the received control signal is regarding update of the board information (S1208: Yes), the information processing terminal 10 returns to step S1201 to display the board information on the basis of the control signal.

On the other hand, in the case where the control signal is not regarding update of the board information (S1208: No), the information processing terminal 10 determines whether or not the control signal is regarding establishment of a sales and purchase transaction.

Here, in the case where the control signal is regarding establishment of a sales and purchase transaction (S1209: Yes), the information processing terminal 10 displays a screen for performing a process in association with the established sales and purchase transaction on the basis of the control signal (S1210).

On the other hand, in the case where the control signal is not regarding establishment of a sales and purchase transaction (S1209: No), the information processing terminal 10 determines whether or not the control signal is regarding recommendation of a compromise on the transaction conditions.

Here, in the case where the control signal is not regarding recommendation of a compromise on the transaction conditions here (S1211: No), the information processing terminal 10 returns to step S1202.

On the other hand, in the case where the control signal is regarding recommendation of a compromise on the transaction conditions (S1211: Yes), the information processing terminal 10 displays the details of information about the transaction conditions on the basis of the control signal (S1212).

Here, in the case where the user does not agree on the compromise (S1213: No), the information processing terminal 10 returns to step S1202.

On the other hand, in the case where the user agrees on the compromise (S1213: Yes), the information processing terminal 10 executes the aforementioned processes at steps S1205 and S1206, and returns to step S1201.

<<1.5. Variation of Transactions and Characteristics of Transaction Object>>

Next, variation of transactions and characteristics of the transaction object according to the present embodiment will be explained by giving specific examples.

The transaction according to the present embodiment may be a sales and purchase transaction or rental transaction the transaction object of which is a used industrial product, for example. Examples of the above industrial product include an automobile, a camera, and a clock. In this case, examples of characteristics of the transaction product include not only a comprehensive quality but also a cosmetic condition about flaws/stains or the like, an operable condition related to a function and an operation, a usage condition including the number of years in use, a usage frequency, and the like, and a storage condition.

Alternatively, the transaction according to the present embodiment may be a sales and purchase transaction the transaction object of which is a food or an agricultural product, for example. In this case, examples of characteristics of the transaction object include the size or shape, the degree of consciousness to health or the environment (e.g., the agrochemical/chemical-fertilizer use amount), and the degree of freshness. Note that, in the case where the degree of freshness is used as one of the characteristics, it is also possible for the control unit 210 to dynamically control the plot regarding sales orders with the lapse of time while taking deterioration in the degree of freshness into consideration.

Alternatively, the transaction according to the present embodiment may be a sales and purchase transaction or rental transaction the transaction object of which is a real property such as a house, for example. In this case, examples of characteristics of the transaction object include the size (e.g., area of a land or a space, number of rooms), the accessibility (e.g., distance to the nearest station, riding time taken to arrive at a main city, number of transfer times), and the number of years after the construction.

Alternatively, the transaction according to the present embodiment may be various transactions the transaction object of which is an article or service, such as outsourcing, that involves ordering and provision, for example. Examples of the aforementioned article or service that involves ordering and provision include manufacturing of parts, a translation service, and creation of a computer program or web content. In this case, examples of characteristics of the transaction object include the quality and the due time.

Alternatively, the transaction according to the present embodiment may be various transactions the transaction object of which is provision of a service using specialized knowledge or specialized skill. Examples of the aforementioned service include a tutor, a foreign language teacher, instructors of sports, cooking, and handcraft, tour guiding, and photo taking. In this case, examples of characteristics of the transaction object include an evaluation made by a third party (e.g., a reputation developed by past users), the personal attribute (e.g., sight, background, educational background, achievements, and merit), a time period during which service provision is available, and a time period during which service provision is desired.

Alternatively, the transaction according to the present embodiment may be various transactions the transaction object of which is provision of a service related to travel, for example. Examples of the aforementioned service related to travel include arrangement/provision of accommodations and means of transportation such as airplanes and trains. In this case, examples of characteristics of the transaction object include the accessibility (e.g., required time from a main station), comfort (e.g., wideness, facility level), and a season (e.g., whether the season is a busy period or not).

Variation of the transactions and characteristics of the transaction object thereof according to the present embodiment have been explained above by giving specific examples. As explained above, with the program, the information processing apparatus, and the information processing method according to the present embodiment, a demand-supply balance that reflects characteristics of a transaction object can be represented accurately in various transactions.

2. Hardware Configuration Example

Figure 14:
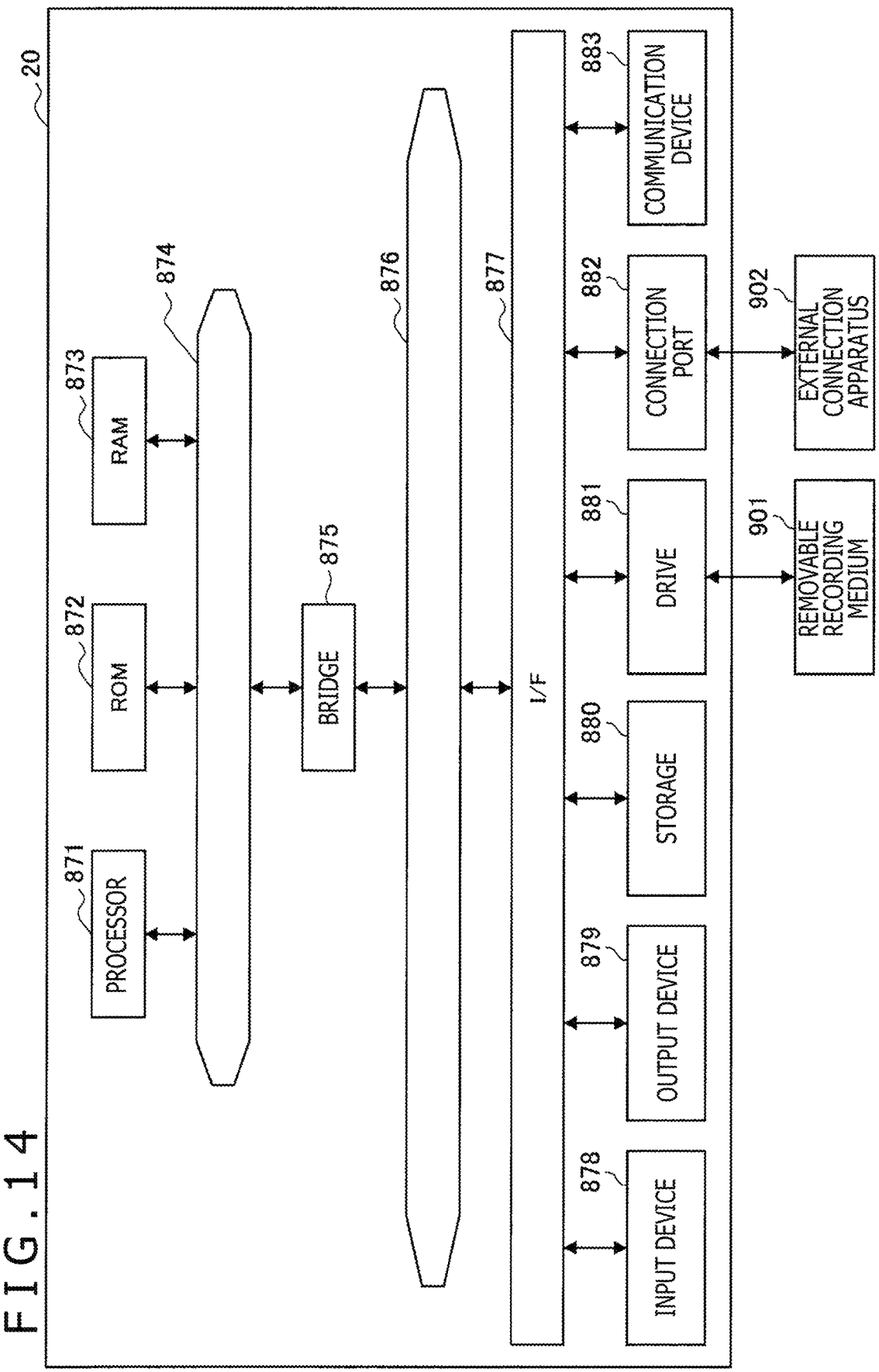
FIG. 14 is a diagram depicting a hardware configuration example of an information processing server according to one embodiment of the present disclosure.

Next, a hardware configuration example of the information processing server 20 according to one embodiment of the present disclosure will be explained. FIG. 14 is a block diagram depicting a hardware configuration example of the information processing server 20 according to one embodiment of the present disclosure. Referring to FIG. 14, the information processing server 20 includes a processor 871, a ROM 872, a RAM 873, a host bus 874, a bridge 875, an external bus 876, an interface 877, an input device 878, an output device 879, a storage 880, a drive 881, a connection port 882, and a communication device 883, for example. Note that the hardware configuration depicted in this drawing is one example, and some of the components may be omitted. Moreover, a component other than those depicted in this drawing may additionally be included.

(Processor 871)

The processor 871 functions as a computation processing device or a control device, for example, and controls, in whole or in part, operation of the components on the basis of various programs recorded in the ROM 872, the RAM873, the storage 880, or a removable recording medium 901.

(ROM 872, RAM 873)

The ROM 872 is means for storing a program to be read by the processor 871, data to be used for computation, and the like. For example, a program to be read by the processor 871, various parameters which vary, as appropriate, during execution of the program, and the like are temporarily or permanently stored in the RAM 873.

(Host Bus 874, Bridge 875, External Bus 876, Interface 877)

The processor 871, the ROM 872, and the RAM 873 are connected to one another via the host bus 874 that enables high-speed data transmission, for example. Meanwhile, the host bus 874 is connected to the external bus 876 via the bridge 875 through which data transmission is performed at relatively low speed, for example. Also, the external bus 876 is connected to various components via the interface 877.

(Input Device 878)

For example, a mouse, a keyboard, a touch panel, a button, a switch, a lever, or the like can be used as the input device 878. Further, a remote controller capable of transmitting a control signal by using infrared rays or other radio waves may be used as the input device 878. In addition, a sound input device such as a microphone is included in the input device 878.

(Output Device 879)

For example, the output device 879 is a display device such as a CRT (Cathode Ray Tube), an LCD, or an organic EL, an audio output device such as a loudspeaker or a headphone, a printer, a mobile phone, a facsimile, or the like, that is, a device capable of visually or audibly notifying a user of acquired information. Further, the output device 879 according to the present disclosure includes various vibration units capable of outputting a tactile stimulus.

(Storage 880)

The storage 880 is a device for storing various kinds of data. For example, a magnetic storage device such as a hard disk drive (HDD), an optical storage device, a semiconductor storage device, an optical magnetic storage device, or the like can be used as the storage 880.

(Drive 881)

For example, the drive 881 is a magnetic disk, an optical disk, an optical magnetic disk, a semiconductor memory, or the like, that is, a device that reads information recorded in the removable recording medium 901 or writes information into the removable recording medium 901.

(Removable Recording Medium 901)

For example, the removable recording medium 901 is a DVD medium, a Blu-ray (registered trademark) medium, a HD DVD medium, various semiconductor storage media, or the like. Needless to say, the removable recording medium 901 may be an IC card having a non-contact type IC chip installed therein, an electronic apparatus, or the like, for example.

(Connection Port 882)

For example, the connection port 882 is a USB (Universal Serial Bus) port, an IEEE1394 port, an SCSI (Small Computer System Interface), an RS-232C port, an optical audio terminal, or the like, that is, a port to which an external connection apparatus 902 is connected.

(External Connection Apparatus 902)

For example, the external connection apparatus 902 is a printer, a mobile music player, a digital camera, a digital video camera, an IC recorder, or the like.

(Communication Device 883)

The communication device 883 is a communication device for connection to a network, and is, for example, a wired or wireless LAN, a Bluetooth (registered trademark) or WUSB (Wireless USB) communication card, an optical communication router, an ADSL (Asymmetric Digital Subscriber Line) router, a modem for various kinds of communication, or the like.

3. Conclusion

As explained so far, the program according to one embodiment of the present disclosure causes a computer to function as a control unit that, on the basis of inputted transaction orders, controls a display regarding a distribution of the transaction orders in a transaction market. The transaction orders may include a provision order inputted by a provider who desires to provide a transaction object and a reception order inputted by a receiver who desires to receive the transaction object. In addition, one feature of the control unit is to dynamically control the display regarding the distribution on the basis of two or more elements including a desired transaction price related to each of the provision order and the reception order and including at least one or more characteristics of the transaction object. With this configuration, a demand-supply balance that reflects characteristics of a transaction object can be represented more accurately.

The preferred embodiment of the present disclosure has been explained so far with reference to the attached drawings, but the technical scope of the present disclosure is not limited to the embodiment. It is clear that a person ordinarily skilled in the technical field of the present disclosure can conceive of various changes and modifications within the scope of the technical concept set forth in the claims. Such changes and modifications are also naturally considered to belong to the technical scope of the present disclosure.

In addition, the effects described herein are illustrative or exemplary but not limitative. That is, besides the above effects or instead of the above effects, the technique according to the present disclosure may provide another effect that is obvious to a person skilled in the art.

In addition, a program for causing hardware such as a CPU, a ROM, or a RAM installed in a computer to exert a function equal to that of the structure of the information processing server 20 may be created. Also, a computer-readable and non-transient recording medium having the program recorded therein can be provided.

Further, the steps related to processing to be performed herein by the information processing server 20 and the information processing terminal 10 are not necessarily required to be performed time-serially in accordance with the order recited in the flowcharts. For example, the steps related to processing to be performed by the information processing server 20 may be performed in an order different from that recited in the flowcharts, or may also be performed in parallel.

Note that the following configurations also belong to the technical scope of the present disclosure.

(1)

A program for causing a computer to function as a control unit that, on the basis of inputted transaction orders, controls a display regarding a distribution of the transaction orders in a transaction market, in which the transaction orders include a provision order inputted by a provider who desires to provide a transaction object and a reception order inputted by a receiver who desires to receive the transaction object, and the control unit dynamically controls the display regarding the distribution on the basis of two or more elements including a desired transaction price related to each of the provision order and the reception order and including at least one or more characteristics of the transaction object.

(2)

The program according to (1) above, in which the control unit causes a display apparatus to display the distribution regarding the provision order and the reception order such that the provision order and the reception order are displayed in different forms.

(3)

The program according to (1) or (2) above, in which the control unit causes a display apparatus to display the distribution regarding the provision order and the reception order by using a graph in which the elements are set as axes.

(4)

The program according to any one of (1) to (3) above, in which the control unit causes a display apparatus to display the distribution regarding the provision order and the reception order by using a two-dimensional graph in which two of the elements that are the desired transaction price and one of the characteristics are set as axes.

(5)

The program according to any one of (1) to (4) above, in which the control unit causes a display apparatus to display the distribution regarding the provision order and the reception order by using a two-dimensional graph which is generated by dimensional compression based on three or more of the elements.

(6)

The program according to any one of (3) to (5) above, in which the control unit performs control to add the provision order to the graph on the basis of the desired transaction price that is inputted by the provider and a characteristic that is inputted by the provider and that is of the transaction object which the provider desires to provide.

(7)

The program according to any one of (3) to (6) above, in which the control unit performs control to add the reception order to the graph on the basis of the desired transaction price that is inputted by the receiver and a characteristic that is inputted by the receiver and that is of the transaction object which the receiver desires to receive.

(8)

The program according to any one of (3) to (7) above, in which the control unit generates, on the basis of a coordinate selected on the graph, the provision order or the reception order with the desired transaction price and the characteristic of the transaction object designated.

(9)

The program according to any one of (1) to (8) above, in which the control unit makes determination as to transaction establishment between the provision order and the reception order on the basis of the desired transaction price and the characteristic of the transaction object.

(10)

The program according to (9) above, in which the control unit determines transaction establishment between the provision order and the reception order on the basis of matching between the provision order and the reception order in the desired transaction price and an item for determining the characteristic of the transaction object.

(11)

The program according to (10) above, in which in a case where matching in either the desired transaction price or the characteristic of the transaction object is not established between the provision order and the reception order, the control unit performs control to issue a notification for recommending a compromise on a transaction condition to at least the provider or the receiver.

(12)

The program according to (11) above, in which in a case where matching in at least one of a plurality of items for determining the characteristics of the transaction object is not established between the provision order and the reception order, the control unit performs control to issue a notification for recommending a compromise on a transaction condition to the receiver.

(13)

The program according to any one of (1) to (12) above, in which the characteristics at least include a quality of the transaction object.

(14)

The program according to (13) above, in which the control unit determines a quality of the transaction object on the basis of at least any one of an inputted usage condition, an inputted operation condition, an inputted cosmetic condition, and an inputted storage condition of the transaction object.

(15)

The program according to any one of (1) to (14) above, in which the characteristics at least include a due time for the transaction object.

(16)

The program according to any one of (1) to (15) above, in which the provision order and the reception order at least include a sales order regarding sale of the transaction object and a purchase order regarding purchase of the transaction object, respectively, and the control unit dynamically controls a display regarding the distribution of the sales order and the purchase order.

(17)

An information processing apparatus including:

a control unit that, on the basis of inputted transaction orders, controls a display regarding a distribution of the transaction orders in a transaction market, in which the transaction orders include a provision order inputted by a provider who desires to provide a transaction object and a reception order inputted by a receiver who desires to receive the transaction object, and the control unit dynamically controls the display regarding the distribution on the basis of two or more elements including a desired transaction price related to each of the provision order and the reception order and including at least one or more characteristics of the transaction object.

(18)

An information processing method including:

controlling, by a processor, on the basis of inputted transaction orders, display regarding a distribution of the transaction orders in a transaction market, in which the transaction orders include a provision order inputted by a provider who desires to provide a transaction object and a reception order inputted by a receiver who desires to receive the transaction object, and the controlling further includes dynamically controlling the display regarding the distribution on the basis of two or more elements including a desired transaction price related to each of the provision order and the reception order and including at least one or more characteristics of the transaction object.

REFERENCE SIGNS LIST

10 Information processing terminal
20 Information processing server
210 Control unit
220 Storage unit
230 Communication unit
30 Network

The invention claimed is:

1. A non-transitory computer-readable medium having embodied thereon a program, which when executed by a computer causes the computer to execute an information processing method, the method comprising:

controlling, on a basis of inputted transaction orders, a display regarding a distribution of the transaction orders in a transaction market, wherein the transaction orders include a provision order inputted by a provider who desires to provide a transaction object and a reception order inputted by a receiver who desires to receive the transaction object, and the controlling further includes dynamically controlling the display regarding the distribution on a basis of two or more elements including a desired transaction price related to each of the provision order and the reception order and including at least one or more characteristics of the transaction object;

causing a display apparatus to display the distribution regarding the provision order and the reception order on a basis of three or more of the elements by using a two-dimensional graph; and generating, on a basis of a coordinate selected on the two-dimensional graph, the provision order or the reception order with the desired transaction price and the characteristic of the transaction object designated.

2. The non-transitory computer-readable medium according to claim 1, wherein the method further comprises causing the display apparatus to display the distribution regarding the provision order and the reception order such that the provision order and the reception order are displayed in different forms.

3. The non-transitory computer-readable medium according to claim 1, wherein the method further comprises causing the display apparatus to display the distribution regarding the provision order and the reception order by using a graph in which the elements are set as axes.

4. The non-transitory computer-readable medium according to claim 1, wherein the method further comprises causing the display apparatus to display the distribution regarding the provision order and the reception order by using a two-dimensional graph in which the two or more elements that are the desired transaction price and one of the characteristics are set as axes.

5. The non-transitory computer-readable medium according to claim 1, wherein in a case the distribution regarding the provision order and the reception is based on the three or more of the elements, the two-dimensional graph is generated by dimensional compression based on the three or more of the elements.

6. The non-transitory computer-readable medium according to claim 3, wherein the method further comprises performing control to add the provision order to the graph on a basis of the desired transaction price that is inputted by the provider and a characteristic that is inputted by the provider and that is of the transaction object which the provider desires to provide.

7. The non-transitory computer-readable medium according to claim 3, wherein the method further comprises performing control to add the reception order to the graph on a basis of the desired transaction price that is inputted by the receiver and a characteristic that is inputted by the receiver and that is of the transaction object which the receiver desires to receive.

8. The non-transitory computer-readable medium according to claim 1, wherein the method further comprises making determination as to transaction establishment between the provision order and the reception order on a basis of the desired transaction price and the characteristic of the transaction object.

9. The non-transitory computer-readable medium according to claim 8, wherein the method further comprises determining transaction establishment between the provision order and the reception order on a basis of matching between the provision order and the reception order in the desired transaction price and an item for determining the characteristic of the transaction object.

10. The non-transitory computer-readable medium according to claim 9, wherein the method further comprises in a case where matching in either the desired transaction price or the characteristic of the transaction object is not established between the provision order and the reception order, performing control to issue a notification for recommending a compromise on a transaction condition to at least the provider or the receiver.

11. The non-transitory computer-readable medium according to claim 10, wherein the method further comprises in a case where matching in at least one of a plurality of items for determining the characteristics of the transaction object is not established between the provision order and the reception order, performing control to issue a notification for recommending a compromise on a transaction condition to the receiver.

12. The non-transitory computer-readable medium according to claim 1, wherein the characteristics at least include a quality of the transaction object.

13. The non-transitory computer-readable medium according to claim 12, wherein the method further comprises determining a quality of the transaction object on a basis of at least any one of an inputted usage condition, an inputted operation condition, an inputted cosmetic condition, or an inputted storage condition of the transaction object.

14. The non-transitory computer-readable medium according to claim 1, wherein the characteristics at least include a due time for the transaction object.

15. The non-transitory computer-readable medium according to claim 1, wherein the provision order and the reception order at least include a sales order regarding sale of the transaction object and a purchase order regarding purchase of the transaction object, respectively, and the method further comprises controlling a display regarding the distribution of the sales order and the purchase order.

16. An information processing apparatus comprising:

a control unit, implemented via a memory and a processor, configured to control, on a basis of inputted transaction orders, a display regarding a distribution of the transaction orders in a transaction market, wherein the transaction orders include a provision order inputted by a provider who desires to provide a transaction object and a reception order inputted by a receiver who desires to receive the transaction object, the control unit is further configured to dynamically control the display regarding the distribution on a basis of two or more elements including a desired transaction price related to each of the provision order and the reception order and including at least one or more characteristics of the transaction object, cause a display apparatus to display the distribution regarding the provision order and the reception order on a basis of three or more of the elements by using a two-dimensional graph, and generate, on a basis of a coordinate selected on the two-dimensional graph, the provision order or the reception order with the desired transaction price and the characteristic of the transaction object designated.

17. An information processing method comprising:
- controlling, by a processor, on a basis of inputted transaction orders, a display regarding a distribution of the transaction orders in a transaction market, wherein
- the transaction orders include a provision order inputted by a provider who desires to provide a transaction object and a reception order inputted by a receiver who desires to receive the transaction object, and
- the controlling further includes dynamically controlling the display regarding the distribution on a basis of two or more elements including a desired transaction price related to each of the provision order and the reception order and including at least one or more characteristics of the transaction object;
- causing a display apparatus to display the distribution regarding the provision order and the reception order on a basis of three or more of the elements by using a two-dimensional graph; and
- generating, on a basis of a coordinate selected on the two-dimensional graph, the provision order or the reception order with the desired transaction price and the characteristic of the transaction object designated.

\* \* \* \* \*